United States Patent [19]

Sederlund et al.

[11] Patent Number: 5,568,615
[45] Date of Patent: Oct. 22, 1996

[54] STEALTH INTERFACE FOR PROCESS CONTROL COMPUTERS

[75] Inventors: Edward R. Sederlund, Saginaw, Mich.; Nadene T. Thomas, Lake Jackson, Tex.; Robert J. Lindesmith, Midland, Mich.; Russell W. Cowles, Lake Jackson, Tex.

[73] Assignee: The Dow Chemical Company, Midland, Mich.

[21] Appl. No.: 487,193

[22] Filed: Jun. 7, 1995

Related U.S. Application Data

[63] Continuation of Ser. No. 897,905, Jun. 12, 1992, abandoned.

[51] Int. Cl.⁶ .................................................. G06F 15/167
[52] U.S. Cl. ............. 395/200.08; 395/476; 364/DIG. 1; 364/228; 364/228.1; 364/244.8
[58] Field of Search .............................. 365/189.04, 195, 365/230.05; 380/3; 395/200.08, 474, 476, 800

[56] References Cited

U.S. PATENT DOCUMENTS

| | | | |
|---|---|---|---|
| 4,212,057 | 7/1980 | Devlin et al. .......................... 395/478 |
| 4,215,398 | 7/1980 | Burkett et al. ......................... 364/136 |
| 4,449,183 | 3/1984 | Flahive et al. ......................... 395/478 |
| 4,479,179 | 10/1984 | Dinwiddie Jr. ........................ 395/845 |
| 4,488,231 | 12/1984 | Yu et al. ............................... 395/868 |
| 4,577,292 | 3/1986 | Bernstein .............................. 365/189 |
| 4,709,325 | 11/1987 | Yjima ................................. 395/182.08 |
| 4,745,541 | 5/1988 | Vaniglia et al. ....................... 364/141 |
| 4,780,812 | 10/1988 | Freestone et al. ..................... 395/476 |
| 4,796,232 | 1/1989 | House ................................ 365/189.03 |
| 4,803,618 | 2/1989 | Ita et al. ............................... 395/474 |
| 4,817,058 | 3/1989 | Pinkham .............................. 365/230 |
| 4,862,354 | 8/1989 | Fiacconi et al. .................. 395/200.06 |
| 4,943,911 | 7/1990 | Kopp et al. .......................... 395/375 |
| 4,965,717 | 10/1990 | Cutts, Jr. et al . ................. 395/182.1 |
| 4,999,768 | 3/1991 | Hirokawa ........................... 395/200.07 |
| 5,072,373 | 12/1991 | Dann ................................. 395/200.08 |
| 5,111,431 | 5/1992 | Garde ................................. 365/129.02 |
| 5,142,676 | 8/1992 | Fried et al. ............................ 395/479 |
| 5,155,855 | 10/1992 | Masuo et al. .......................... 395/72.5 |
| 5,168,560 | 12/1992 | Robinson et al. ..................... 395/450 |
| 5,197,035 | 3/1993 | Ito ..................................... 365/230.05 |
| 5,202,970 | 4/1993 | Schiffleger ............................ 395/478 |
| 5,208,775 | 5/1993 | Lee ..................................... 365/200 |
| 5,329,630 | 7/1994 | Baldwin ............................ 395/497.04 |
| 5,428,769 | 6/1995 | Glaser et al. ......................... 364/133 |

FOREIGN PATENT DOCUMENTS

| | | |
|---|---|---|
| 89284 | 3/1990 | Japan . |
| 0263989 | 11/1991 | Japan . |

OTHER PUBLICATIONS

Jian-Qui, Yin and Hong-Kui, Yang. A Universal DSP System Based on TMS320C25, China 1991 International Conference on Circuits and Systems, pp. 774–779, Jun. 1991.

*Primary Examiner*—Lance Leonard Barry, Esq.
*Attorney, Agent, or Firm*—Dale H. Schultz; William J. Coughlin

[57] ABSTRACT

A stealth interface for an intelligent front-end communication system couples a plurality of actively redundant process control computers to a computer network. The stealth interface in each of the actively redundant process control computers includes a multi-ported memory for storing dynamic data associated with the physical process and for transferring this data to a front end computer which is in communication with the computer network. The multi-ported memory also includes a mailbox section for storing messages sent between the front end computer and its actively redundant process control computer. The stealth interface also includes a guardian circuit which ultimately controls the ability of the front end computer to write information to specific memory locations in the multi-ported data memory.

12 Claims, 7 Drawing Sheets

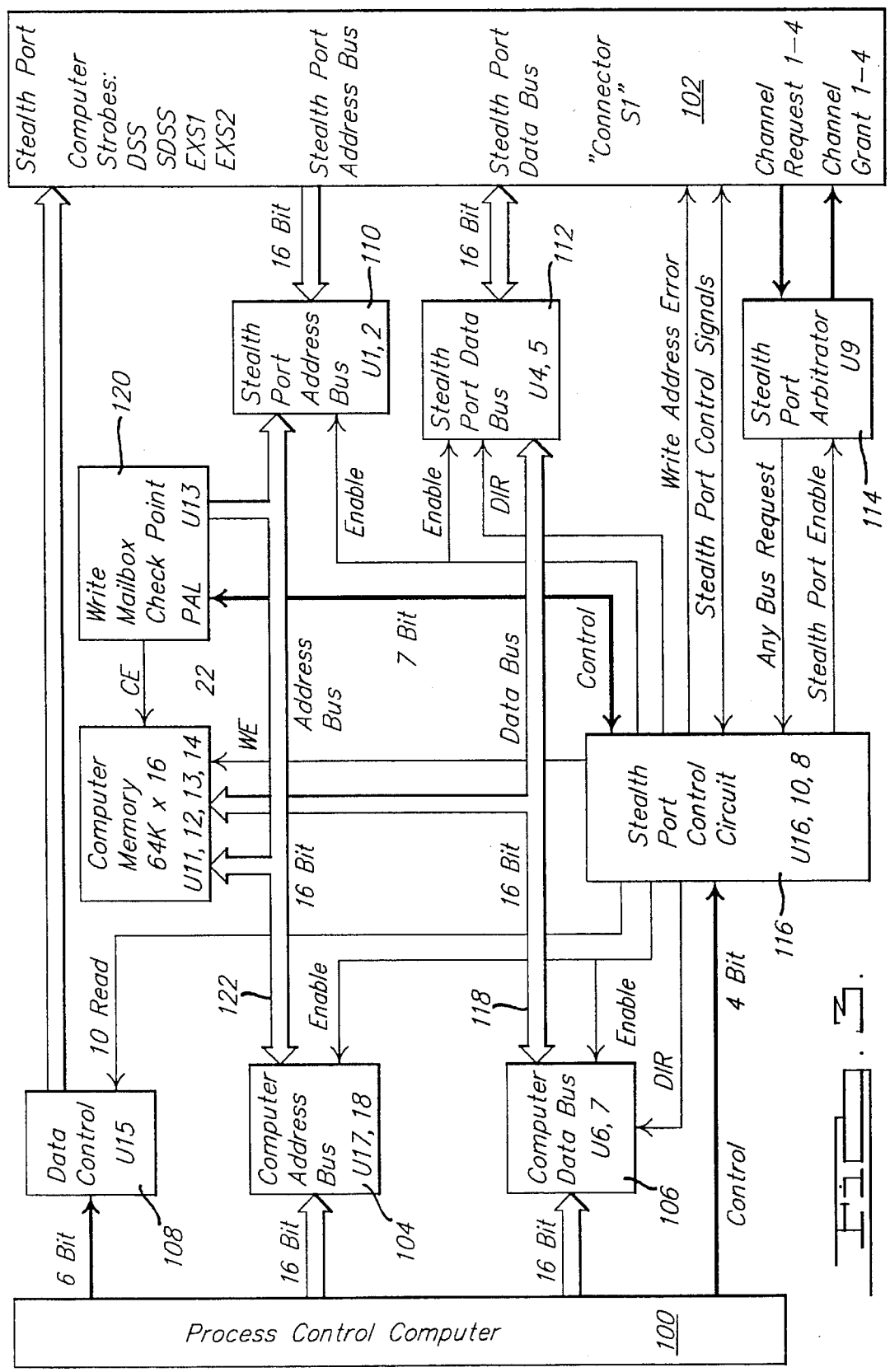

STEALTH INTERFACE FOR PROCESS CONTROL COMPUTERS

This is a continuation of U.S. patent application Ser. No. 07/897,905, filed Jun. 12, 1992, now abandoned.

BACKGROUND OF THE INVENTION

The present invention generally relates to "front-end" communication techniques between process control computers and a plant/local area network. More specifically, the present invention relates to a "stealth" interface for a front-end communication system which is capable of transparently handling rapid data transfers to and from a process control computer with very high reliability and security.

In chemical manufacturing plants and other relatively large processing plants, a network of control computers and operator workstations may be needed to achieve automated control of an ongoing physical process in the plant. For example, the Jones et. al U.S. Pat. No. 4,663,704, issued on May 5, 1987, shows a distributed processing system for a plant in which a single data highway connects all the various input/output terminals, data acquisition stations, control devices, record keeping devices and so forth. Similarly, the Henzel U.S. Pat. No. 4,607,256, issued on Aug. 19, 1986, shows a plant management system which utilizes a plant control bus for the purpose of transmitting data to physical computer modules on the network.

In some of these process control computer networks, redundant process control computers are employed to enhance the reliability of the plant control and monitoring system. For example, the Fiebig et. al U.S. Pat. No. 5,008,805, issued on Apr. 16, 1991, shows a networked control system which includes a "hot standby" redundant processor that synchronously processes a control schedule table for comparison with control messages from a sender processor that are transmitted on the network. The redundant listener processor maintains a duplicate configuration in its memory ready to take over control of the system in the event of a failure of the sender processor. As another example, the McLaughlin et. al U.S. Pat. No. 4,958,270, issued on Sep. 18, 1990, shows a networked control system which employs a primary controller and a secondary controller. In order to maintain consistency between the primary data base and a secondary image of the data base, only predetermined areas changed are updated as a way of increasing the efficiency of the update function. Similarly, the Slater U.S. Pat. No. 4,872,106, issued on Oct. 3, 1989, shows a networked control system which employs a primary data processor and a back-up data processor. Normally, the back-up processor will be in a back-up mode of operation, and it will not operate to exercise control over the input/output devices or receive data concerning the states of the input/output devices. Accordingly, control over the input/output devices is exclusively carried out by the primary processor. However, the primary processor periodically transfers status data relating to its operation in the control of the input/output devices to the back-up data processor via a dual ported memory connected between the two processors.

In contrast with the above networked control systems, another control technique for redundant process control computers exists in which both of the process control computers operate on input data and issue control commands to the same output devices. This type of control technique may be referred to as active redundancy, because each of the redundant process control computers operate independently and concurrently on common input data. A discussion of this type of control technique may be found in the Glaser et al U.S. patent application Ser. No. 07/864,931, filed on Mar. 31, 1991, entitled "Process Control Interface System Having Triply Redundant Remote Field Units" now U.S. Pat. No. 5,428,769. This application is hereby incorporated by reference.

The use of active redundancy as a control technique presents a difficult problem in terms of communication with the plant computer network, as each actively redundant process control computer will receive a set of input values and each of these process control computers will generate a set of output values. In the case where the actively redundant process control computers arbitrate or resolve some or all of the input and/or output values, to the extent that differences do exist, then multiple sets of input and output values could be created. For example, a set of pre-arbitration and post-arbitration input data values could potentially be available from each of the actively redundant process control computers. Accordingly, it would be desirable to enable some or all of these data sets to be matched up and analyzed by another computer on the plant network without interfering with or slowing down the operation of the actively redundant process control computers.

Additionally, it would be desirable to permit one or more of the computers on the plant network to modify certain values used by the program in each of the actively redundant process computers as the need may arise, such as analog constants. However, it should be appreciated that such an activity would need to be restricted in some manner, as predictable changes in the operation of physical devices should be assured.

Accordingly, it is a principal objective of the present invention to provide a stealth interface for a front-end communication system which enables rapid and highly reliable data transfers between an actively redundant process control computer and a plant/local area network.

It is another objective of the present invention to provide a stealth interface for a front-end communication system which enables data transfers in a manner that is non-intrusive to the operation of the actively redundant process control computer.

It is also an objective of the present invention to provide a stealth interface for a front-end communication system which enables messages to be transferred to the actively redundant process control computers in a non-intrusive manner to the operation of the actively redundant process control computer.

It is a further objective of the present invention to provide a stealth interface which enables the actively redundant process control computer to ultimately control write operations by external entities to memory locations in the actively redundant process control computer.

It is an additional objective of the present invention to provide a stealth interface which is capable of handling data transfers with a plurality of external communication devices.

SUMMARY OF THE INVENTION

To achieve the foregoing objectives, the present invention provides a "stealth" interface for a front-end communication system which is interposed between a plurality of actively redundant process control computers and a computer network. A separate stealth interface resides in each of the actively redundant process control computers, and each of these stealth interfaces communicate with a front end computer which is coupled to the computer network. Each stealth interface features a multi-ported memory for storing dynamic data associated with the physical process, and for transferring some or all of this data to the computer network. In this regard, the stealth interface derives its name from its ability to transfer data from the multi-ported memory in a way which is transparent to its actively redundant process control computer. In one form of the present invention, the front end computer is permitted read access to all of the memory locations in the multi-ported memory.

The multi-ported memory of the stealth interface also includes a mailbox section which is used to store messages from the front end computer to the actively redundant process control computer. However, in order to more completely control this write access capability by the front end computer, the stealth interface further includes a guardian circuit which prevents the front end computer from writing to any memory location in the multi-ported memory other than the mailbox section. Accordingly, while the front end computer may be permitted read access to the entire contents of the multi-ported memory, the actively redundant process control computer will ultimately determine the write access for the front end computer. The mailbox section of the multi-ported memory will also enable the front end computer to transfer new computer program instructions to the actively redundant process control computer in a download mode.

In one form of the present invention, the multi-ported memory in each of the actively redundant process control computers also includes an arbitration technique for permitting the multi-ported memory to be accessed by a plurality of different communication devices. Thus, the dynamic data and/or other variable data stored in the multi-ported memory may be made accessible to other external entities without interfering in any way with the operation of the actively redundant process control computer.

Additional features and advantages of the present invention will become more fully apparent from a reading of the detailed description of the preferred embodiment and the accompanying drawings in which:

BRIEF DESCRIPTION OF THE DRAWINGS

FIG. 3 is a block diagram of the stealth interface shown in FIG. 1.

DETAILED DESCRIPTION OF THE PREFERRED EMBODIMENTS

Figure 1:
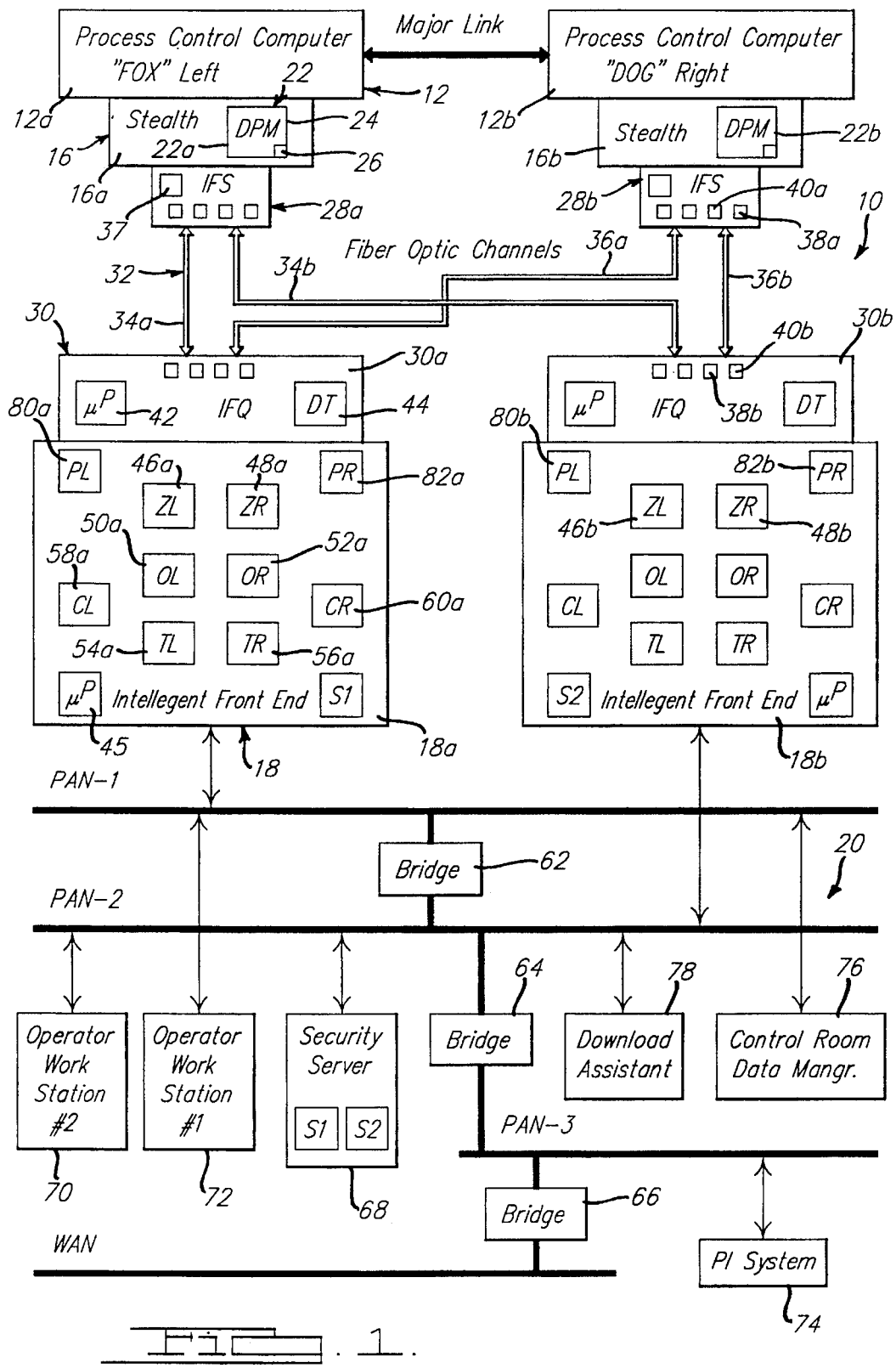
FIG. 1 is a block diagram of an intelligent front-end communication system for a plurality of actively redundant process control computers which utilizes a stealth interface according to the present invention.

Referring to FIG. 1, a block diagram is shown of an intelligent front-end communication system 10 which is coupled to a pair of actively redundant process control computers 12a–12b. Each of the process control computers 12a–12b receive common input data from field computer units (not shown) or other suitable field instrumentation. In this regard, the Glaser et. al. U.S. patent application Ser. No. 07/864,931, referenced above, describes in detail the communication and control links between a pair of actively redundant process control computers, such as process control computers 12a–12b, and the input/output devices directly associated with the physical process being controlled.

While the redundancy of two actively operating process control computers has certain fault tolerance advantages over a single decision making process control computer, it should be understood that the principles of the present invention are not limited to any particular configuration of process control computers. Thus, for example, it may be desirable to employ three process control computers in the place of the two process control computers 12a–12b shown in FIG. 1 under the appropriate circumstances.

In the present embodiment, the process control computers 12a–12b preferably operate concurrently on all of the signals transmitted from one or more field computer units. In other words, each of the process control computers 12a–12b are capable of making independent decisions based upon the data received by these redundant computers from the field. The decisions made by the process control computers 12a–12b determine the output signal values which are ultimately directed to specific output devices (e.g., valves, pump motors and reactor heaters) by the appropriate field computer units. While the output signal values are preferably reconciled at least to some extent between the two actively redundant process control computers 12a–12b before the transmission of these signals to the field, it should be understood that two independent sets of output signal values could be communicated to the field computer units. In this regard, the input values received from a field computer unit could be arbitrated, which should make it unnecessary to reconcile or arbitrate output values. This is because both of the process control computers 12a–12b would then be working with the same process control program and operating on the same set of arbitrated input values.

As an example of a preferred form of possible value reconciliation, corresponding input value tables in each of the process control computers 12a–12b could be compared during a preset time period, and one of the values could be chosen for each input value signal to be subjected to the process control program. This selection of input values could be made on a suitable criteria to the process being controlled, such as the use of the value determined by the Left process control computer 12a when the value determined by the Right process control computer 12b is within a certain predetermined percentage limit (e.g., 2.5%). Otherwise, the distinct input values of both the Left and Right process control computers could each be employed when these values are found to be outside the predetermined percentage limit. Alternatively, the selection of different input/output values from the Left and Right process control computers could be made on the basis of a software implemented preference. Thus, for example, under certain process conditions, it may be considered more appropriate to select either the high or low value, regardless of whether the value was determined by the Left or Right process control computer.

To facilitate this arbitration or reconciliation process, a parallel communication link 14 is provided between the process control computers 12a–12b. Parallel communication link 14 is referred to as the "major" link, as it permits a direct transfer of data and timing signals between the process control computers. It should also be noted that the Left process control computer 12a is labeled "fox", while the Right process control computer 12b is labeled "dog". These are logical designations for alternative operating modes of the process control computers 12a–12b.

While each of the process control computers 12a–12b make independent decisions, which may be subject to arbitration, the process control computer currently in the fox mode has the ability to force the process control computer in the dog mode to move to a subsequent step in a programmed sequence in order to keep the cooperative efforts of the two process control computers in relative synchronization. Additionally, the process control computer in the fox mode will transmit a timing signal to the process control computer in the dog mode at the beginning of its process control program cycle (e.g., a one second period), so that the process control computer in the dog mode will know to begin a new process control program cycle as well. As the process control computers 12a–12b operate under their own clock oscillators, the detection and interpretation of this program cycle timing signal by the process control computer in the dog mode will help to periodically keep these process control computers in relative synchronization. However, it should be appreciated that the program cycle of the process control computer in the dog mode will typically follow the program cycle of the process control computer in the fox mode by the period of time it takes to transmit and then detect the program cycle timing signal (e.g., 20-microseconds to 20-milliseconds).

In the event that process control computers 12a–12b are temporarily not able to communicate over the major link 14, each of these process control computers will continue their operations in a mode which assumes that they are operating alone. In this mode of operation, it should be appreciated that the program cycles of the process control computers 12a–12b may gradually drift apart in time relative to each other. Nevertheless, as will be seen from the discussion below, the front end communication system 10 is designed to enable data received from the process control computers 12a–12b to be time aligned for real-time analysis.

As illustrated in FIG. 1, each of the process control computers 12a–12b includes a stealth interface according to the present invention. In particular, process control computer 12a includes stealth interface circuit 16a, while process control computer 12b includes stealth interface circuit 16b. As the stealth interface circuits 16a–16b comprise identical circuits, these stealth interface circuits are sometimes referred to generally herein as stealth interface circuit 16. Due to the redundant nature of the front end communication system 10, a general reference number will also be used for other duplicative components in the system.

The stealth interface 16 provides transparent data transfers between the process control computer to which it is connected and external communication devices. In this regard, the data transfers are transparent to the process control computer 12 in that the operation of the process control computer is not delayed or otherwise adversely affected by a transfer of its data to one or more external communication devices. The stealth interface 16 also enables the transfer of messages from an external communication device without affecting the operation of the process control computer 12. The primary example of such an external communication device is shown in FIG. 1 to be comprised of a pair of redundant front end computers 18a–18b. The front end computers 18a–18b are redundant, because communication paths are provided for enabling each of these front end computers to exchange data and messages with both of the stealth interface circuits 16a–16b.

Each of the front end computers 18a–18b provide a highly intelligent interface between the stealth interface circuits 16a–16b and a plant/local area network, which is generally designated by reference numeral 20. However, since each of the redundant front end computers 18a–18b are capable of communicating with each of the stealth interface circuits 16a–16b, it should be appreciated that this redundancy is not required, and that a single front end computer could be utilized in the appropriate application. Additionally, as will be more apparent from the discussion below, each of the stealth interface circuits are capable of exchanging data and messages with other external communication devices, as well as the front end computers 18a–18b.

As illustrated in FIG. 1, the stealth interface circuit 16 features a dual-ported memory "DPM" 22 which resides on the bus structure of the process control computer 12. Indeed, in the embodiment disclosed herein, the dual-ported memory 22 provides the primary or only data memory for the process control computer 12. Thus, in accordance with the present invention, the stealth interface circuit 16 will selectively grant external devices direct access to the data memory of the process control computer itself. The dual-ported memory 22 includes an internal port which is connected to the bus structure of the process control computer 12 and an external port, which is sometimes referred to herein as the stealth port. While the dual-ported memory 22 could be configured to provide additional ports, the dual-ported memory preferably includes an arbitration circuit which enables a plurality of external communication devices to have alternative access to the stealth port. In other words, only one external device will be able to use the data and address lines of the stealth port at any given time when access to the dual-ported memory is permitted through the stealth port, even though more than one external device may ultimately be coupled to the data and address lines of the stealth port. In the present embodiment, the stealth interface arbitration circuit employs a first-come, first-serve approach to granting access rights.

However, in accordance with the present invention, this arbitration circuit operates only on the stealth port. There is no arbitration per se between the internal and external ports of the stealth interface circuit 16. Rather, access to the dual-ported memory 22 from the external/stealth port is available only during those times when the process control computer 12 cannot access the dual-ported memory. More specifically, in the form of the invention disclosed herein, the machine cycle of the process control computer 12 is utilized to control access to the dual-ported memory 16. As is well known, the central process unit of any computer must fetch and decode one or more programmed instructions in order to operate on one or more data words. In computers based upon the von Neumann architecture, it typically takes several computer clock cycles to fetch, decode and execute an instruction. However, in the present embodiment, the process control computer 12 is based on the Harvard architecture, which permits both an op-code instruction and the operand data for this instruction to be fetched in the same clock cycle. This is because a computer based upon the Harvard architecture includes physically separate instruction and data stores, and each of these stores have their own address and data lines to the central processing unit. Thus, during the portion of the clock cycle for the process control computer 12 that is devoted to fetching and decoding an instruction, the dual-ported data memory 22 may be accessed from the stealth port. Then, during the portion of the clock cycle for the process control computer 12 that is devoted to fetching the operand from the data store, the process control computer will have access to the dual-ported data memory 22 from the internal port.

In accordance with the present invention, the stealth interface circuit 16 watches for a specific transition in the memory clock signal of the process control computer 12 in order to determine when the stealth port may have access to the dual-ported data memory 16. In this regard, it should be understood that the process control computer itself is not affected by this external access, as external access is permitted by the stealth interface circuit 16 only during those time periods when the process control computer 12 will not need to access the dual-ported data memory 22. Indeed, the process control computer 12 does not even have to know that externally generated read/write activity is actually occuring with respect to its data store. Nevertheless, in accordance with the present invention, an important distinction is made between the ability to "read" from the dual-ported data memory 22 and the ability to "write" to the dual-ported data memory, as far as the stealth port is concerned. While it may be desirable to enable an external communication device to read each and every memory location in the dual-ported data memory 22, this may not be true with respect to the ability of an external device to write to memory locations in the dual-ported memory. In this regard, the dual-ported data memory 22 will store not only dynamic data associated with the physical process being controlled, but it may also store other process control variables, such as analog and digital constants.

Accordingly, the dual-ported memory 22 includes two "logical" memory sections, namely variable section 24 and mailbox section 26. These memory sections are logically distinct, because they are treated separately, even though they may both reside in the same physical memory circuit chip or chip set. In the present embodiment, the mailbox section 26 is comprised of a set of 256 memory word locations (16 bits each) in the dual-ported data memory 22, and the variable section 24 is comprised of the remaining memory locations in the dual-ported data memory 22 (e.g., a block of 64k memory word locations). The variable section 24 may also include a message area for holding messages from the process control computer 12 to the front end computer 18. The mailbox section 26 is used to provide a specific region in memory for storing messages from external devices, such as the front end computers 18a–18b. In this regard, it should be appreciated that the memory locations of the mailbox section 26 do not need to be physically contiguous. While the mailbox section 26 may be configured to hold more than one message at any one time, depending upon the message transmission protocol employed, the mailbox section need only be large enough to hold one complete message. These messages may be as simple as an external request for the process control computer 12 to gather and transmit health/status data from a remote field computer unit that it may obtain less frequently. A message may also include a command to change a particular variable stored in the dual-ported data memory 22. Additionally, the mailbox section 26 of the dual-ported data memory 22 may also be used to electronically convey a program revision to the process control computer 12.

As will be more fully discussed below, the stealth interface circuit 16 includes a guardian circuit which prevents any external entity from writing to any memory locations in the variable section 24 of the dual-ported data memory 22. Thus, while some or all of the memory locations in the dual-ported data memory 22 may be read from the stealth port, an external entity is only permitted to write to the memory locations in the mailbox section 26 of the dual-ported memory 22. This feature of the present invention provides a hardware safe-guard at the process control computer 12 which insures that no external entity will be able to inadvertently interfere with the data processing operations of the process control computer 12. As will be more apparent from the discussion below, this feature of the present invention could also be employed to grant or deny external write access to any particular memory location or set of memory locations in the dual-ported data memory 22.

In order to rapidly pump data into or out from the stealth port, the front end communication system 10 of FIG. 1 is also shown to include an interface to stealth "IFS" circuit 28, an interface to Q-bus "IFQ" circuit 30, and a set of fiber optic cables 32 interposed therebetween. The IFS circuit 28 is connected to the stealth port of the dual-ported data memory 22, while the IFQ circuit 30 resides on the "Q bus" of the front end computer 12. Due to the redundant nature of the front end communication system 10, it should be appreciated that the IFS circuit 28a is connected to the stealth port of dual-ported data memory 22a, while IFS circuit 28b is connected to the stealth port of dual-ported data memory 22b. Similarly, the IFQ circuit 30a is connected to the Q bus of the front end computer 18a, while the IFQ circuit 30b is connected to the Q bus of the front end computer 18b. In the embodiment disclosed herein, the front end computer 18 is preferably comprised of a MICROVAX 3400 computer using the real-time ELN operating system from the Digital Equipment Corporation "DEC". While the VAX family of computers from DEC offer considerable speed and networking advantages, it should be appreciated that other suitable front end computers may be employed in the appropriate application.

In order to permit each of the front end computers 18a–18b to conduct bi-directional communications with both of the stealth interface circuits 16a–16b, the fiber optic cables 32 actually include two sets of send and receive optical fibers (e.g., 62.5/125/0.275NA type fibers). However, the separate send and receive optical fibers for each of the front end computers 18a–18b are represented as single channels in FIG. 1 for simplicity. Thus, fiber optic channel 34a includes a separate optical fiber for sending information from the front end computer 18a to the stealth interface circuit 22a and an optical fiber for receiving information from the stealth interface circuit 22a. Similarly, the fiber optic channel 36a includes a separate optical fiber for sending information from the front end computer 18a to the stealth interface circuit 22b and an optical fiber for receiving information from the stealth interface circuit 22b. This arrangement of optical fibers is also duplicated for the front end computer 18b.

In the present embodiment, the combination of the IFS circuit 28, the IFQ circuit 30 and the fiber optic cables 32 provide an optical transmission interface which permits the front end computers 18a–18b to be remoted located from the process control computers 12a–12b. For example, in this embodiment it is possible for the front end computers 18a–18b to be located up to 2 km from the process control computers 12a–12b. Additionally, it should be noted that the Fiber Distributed Data Interface "FDDI" protocol may be used to transmit information between the IFQ and IFS circuits over the fiber optic cables 32.

The IFS circuit 28 includes the appropriate address and data buffer circuits (not shown) for transferring information to and from the stealth port of the dual-ported data memory 22. The IFS circuit 28 also includes a transfer map 37 which enables data from selected locations in the dual-ported data memory 22 to be gathered and transferred as one contiguous block of data. The transfer map 37 may be comprised of a static RAM with sufficient address storage capability to gather data from all of the available memory locations in the dual-ported data memory 22.

Addtionally, the IFS circuit 28 includes a separate transmitter and receiver circuit for each of the two front end computers 18a–18b, such as transmitter 38a and receiver 40a. The transmitter 38a is adapted to convert parallel data words (e.g., 16 bits) from the stealth port into a serial bit stream suitable for transmission over one of the fiber optic cables 32. Similarly, the receiver 40a is adapted to convert a serial bit stream from the front end computer 18 into a parallel data word for transmission to the stealth port through one or more of the IFS circuit buffers. A corresponding set of transmitters and receivers are also provided in the IFQ circuit 30, such as transmitter 38b and receiver 40b. From the above, it should be appreciated that the use of two sets of transmitter-receiver pairs enables data to be transferred and/or received simultaneously between both of the IFS circuits 28a–28b and both of the IFQ circuits 30a–30b. Thus, for example, the IFS circuit 28 is capable of simultaneously transmitting data acquired from the process control computer 12a to both of the front end computers 18a–18b.

While not shown for illustration simplicity, it should appreciated that a laser or LED light source is interposed between each of the transmitters (e.g., transmitters 38a–38b) and their respective optical fibers. Similarly, a photo-detector is also interposed between each of the receivers (e.g., receivers 40a–40b) and their respective optical fibers. For example, these light converters may be comprised of a pair of AT&T ODL200 series converters. While fiber optic cables are preferred for their speed, low error rate and security advantages over mediums such as coaxial cable, it should be understood that that other suitable data transmission medium could be employed in the appropriate application.

In the present embodiment, the transmitters and recievers in the IFS and IFQ circuits are preferably comprised of a high-performance Gallium Arsenide chipset, such as the "Gazelle" GA9011 transmitter and GA9012 receiver from Triquint Semiconductor,Inc., 2300 Owens St., Santa Clara, Calif. These particular transmitters and receivers permit data transmission rates in excess of 200 Mbits/second. These transmitters and receivers utilize a 40-bit wide parallel bus which enables data to be encoded into a 50-baud word using FDDI-standard 4B/5B encoding. In this encoding, 4-bit data nibbles are translated into a 5-baud code symbol. Accordingly, the 4B/5B encoding produces ten 5-baud symbols from ten 4-bit data nibbles in order to comprise a data frame. The GA9011 transmitters also convert the serial stream from a Non-Return to Zero "NRZ" format to a Non-Return to Zero, Invert on ones "NRZI" format, which combines the transmission of data and clock signals into a single waveform. The NRZI waveform denotes a logical one with a polarity transition and a logical zero with no transition within the bit-time-frame. These logical ones and zeros are called bauds, and each group of five bauds are called a symbol. For example, a "0000" 4-bit binary input will be converted to a "11110" 5-baud binary symbol output, while a "1011" 4-bit binary input will be converted to a "10111" 5-baud binary symbol output.

The use of 4B/5B encoding and NRZI formating combine to substantially enhance the reliability of high-speed data transmissions over the fiber optic cables. The GA9012 receivers have built in clock and data recovery (e.g., NRZI to NRZ conversion), and they also monitor the incoming 5B symbols for validity. In this regard, the 4B/5B encoding creates a number of invalid symbols which may be checked for at the GA9012 receivers. As the presence of noise or jitter across the fiber optic link could cause one or more of the bauds to change to an unintented value, the detection of invalid symbols reduces the possibility of a transmission error going undetected.

As an additional layer of protection from potential errors, data transmissions from the IFS circuit 28 are formed into complete data frames, which are comprised of the data to be transferred (i.e., the 40-bit input data frame), a 16-bit destination address field, a 4-bit control code field and a 4-bit error detection code field. These complete data frames are preferably separated from each other on the fiber optic link by at least one sync frame. As potential physical link errors may have a burst or clustering nature, the error code needs to be able to detect up to four contiguous bit errors. In this regard, a Longitudinal Redundancy Check "LRC" code is employed to prevent masked errors from potentially corrupting subsequent data processing operations. This type of error code is also referred to as a "Longitudinal Parity Check". In a LRC code, a 4-bit nibble composed of parity bits is generated and inserted into the encoded data stream for a predetermined number of data nibbles in the encoded data stream, as shown below:

|  | b4 | b3 | b2 | b1 |  |
|---|---|---|---|---|---|
| data nibble 1 | \| x | x | x | x | \| |
| data nibble 2 | \| x | x | x | x | \| |
| data nibble 3 | \| x | x | x | x | \| |
| . |  |  |  |  |  |
| data nibble 8 | \| x | x | x | x | \| |
| data nibble 9 | \| x | x | x | x | \| |
| data nibble 10 | \| p4 | p3 | p2 | p1 | \| | where $p_i = b_{i1}$ Xor $b_{i2}$ Xor ... Xor $b_{i9}$, and i=bit location 1 to 4. Thus, the ith bit of this parity check character checks the ith information bit position in data nibbles 1 through 9 under even parity conditions. The combination of the LRC error checking, the 4B/5B encoding and the NZRI conversion enable the front end communication system 10 to provide a targeted Baud Error Rate "BER" of 1E-12. While a Cyclic Redundancy Check "CRC" code could be employed in lieu of the LRC code, the more complicated CRC code would also increase the complexity of the IFQ and IFS circuits. Additionally, the LRC coding more readily permits dual fiber optic channel signal transmissions between the IFS and IFQ circuits, and the intrinsic sychronization features of the the Gazelle transmitters 38a–38b and receivers 40a–40b may be used to frame the LRC based protocols.

The IFQ circuit 30 includes a microprocessor 42 (e.g., an Intel 80186 chip) which provides the data pump for the front end computer 18. The microprocessor 42 is not only responsible for all IFQ/IFS protocol control and relaying data from the process control computers 12a–12b to a destination on the network 20, but it is also responsible for controlling the integrity of write activities to the IFS and IFQ circuits. For example, the microprocessor 42 may be used to program the transfer map 37 in the IFS circuit 28, so that only a particular sub-set of data in the dual-ported data memory 22 may be gathered and transmitted to the front end computer 18, if less than all of the available variables (e.g., input/output values, alarms and events) is desired. In this way, the actual contents of the transfer map 37 may be dependent upon a specific process control application.

All signal transmissions between the IFQ circuit 30 and the IFS circuit are under the control of IFQ circuit microprocessor 42. In this regard, there are three types of data transmissions from the IFQ circuit 30 to the IFS circuit 28, namely "load transfer map", "send command messages" and "receive data". The load transfer map transmission will enable the IFQ circuit 30 to load the transfer map 37 of the IFS circuit 28 with the specific variable addresses which will steer the data memory transmit bursts from the IFS circuit. The receive data transmission will cause the IFS circuit 28 to return the requested segment of memory from the dual-ported data memory 22.

A command message transmission will start with a Write-Lock request to the IFS circuit 28. Assuming that incoming buffer is free, the IFS circuit 28 will assert a Write-Lock on the mailbox section 26 of the dual-ported data memory 22, and return a positive acknowledgement to the IFQ circuit 30. The IFQ circuit 30 may then transmit its message with the assurance that no other device will be able to write to the mailbox section 26 until its message has been completely stored and preferably read by the process control computer 12. However, a time limit may be imposed on the Write Lock to ensure that the flow of communications is not impeded by one of the external entities connected to the stealth interface circuit 16. It should also be appreciated that message transmissions should not take place during any time in which a data burst should be received from the IFS circuit 28.

As another measure of data transmission protection, the IFQ circuit 30 will cause the IFS circuit 28 to read back a message transmitted to and stored in the mailbox section 26 of the dual-ported data memory 22 in order to be sure that the message was transmitted and stored correctly. Once the IFQ circuit 30 determines that the message has been accurately received and stored, then the IFQ circuit will cause a flag to be set which will signal the process control computer 12 to pick up the new message. In the event that this data verification fails, then the entire message transmission process will be repeated.

The IFQ circuit 30 also includes a process data buffer 44, which is shown as block in FIG. 1 for illustration simplicity. However, the process data buffer 44 should include sufficient memory capacity to store a separate data table for each of the process control computers 12a–12b (e.g., 262,144 bytes). Each of these data tables will include both the SDSS and DSS data transmissions. Additionally, a DMA buffer (not shown) may also be provided to allow some elasticity in processing the data being received. In this regard, it should be noted that the both the IFS circuit 28 and the IFQ circuit 30 are configured to facilitate bi-directional Direct Memory Access "DMA" transfers between the IFQ circuit 30 and the Q-bus of the front end computer 18. In this way, the central processing unit 45 of the front end computer 18 does not need to devote substantial time to processing data transfers to and from the IFQ circuit 30. Accordingly, the DMA buffer is preferably used as a bucket brigade area to perform DMA transfers on blocks of data from the process data buffer 44 (e.g., 8K bytes at a time) to a suitable memory residing on the Q-bus of the front end computer 18.

The use of DMA transfers also enhances the ability of the front end communication system 10 to achieve the goal of making available real-time data from the process control computers 12a–12b to one or more computers on the network 20. More specifically, the front end communication system 10 is designed to request, receive and answer network queries on both pre-link and post-arbitrated data from each of the process control computers 12a–12b within a one-second time resolution. For example, in this particular embodiment, each of the process control computers 12a–12b will issue a Sequence Data Stable Strobe "SDSS" signal in every one-second program cycle, which indicates that approximately 1024 (16 bit) words of pre-link dynamic analog/digital input data is stable and available in the dual-ported data memory 22. This specific data set is referred to as pre-link data, as this data has not yet been arbitrated between the process control computers 12a–12b via data transmissions across the major link 14. Subsequently, in the same one-second program cycle, each of the process control computers 12a–12b will issue a Data Stable Strobe "DDS" signal, which indicates that a complete set of post-arbitrated input and output data is stable and available in the dual-ported data memory 22. This data set is referred to as post-arbitrated, as the input values will have been arbitrated or resolved by this point in the program cycle. In the present embodiment, this post-arbitrated data set may be comprised of up to 65,536 (16-bit) words, as it will include both input and output values (and any other variables stored in the dual-ported data memory 22).

It should also be noted at this point that one of the first functions in the program cycle of the process control computers 12a–12b is to make output value decisions from the post-arbitrated input data obtained in the immediately preceding program cycle. Accordingly, it should be appreciated that the post-arbitrated data set will include the arbitrated input values from the current program cycle and the output values from the immediately previous program cycle.

It is also important to understand that the function of obtaining a copy of the pre-link and post-arbitrated data sets cannot be permitted to delay the operations of the process control computers 12a–12b. Thus, for example, the front end communication system 10 must be sufficiently fast to obtain a copy of the pre-link data sets before the process control computers 12a–12b need to have the ability to change one or more of these data values through the arbitration process. Accordingly, in the context of the present embodiment, the front end communication system 10 needs to be able to acquire a pre-link data set within ten milliseconds of the time that the SDSS signal was initially asserted in order to have the assurance of data stability. Similarly, the front end communication system 10 needs to be able to acquire a post-arbitrated data set within fifty milliseconds of the time that the DSS signal was initially asserted. In this regard, it should be appreciated that each of these data sets need to be independently acquired from both of the process control computers 12a–12b by each of the front end computers 18a–18b. Additionally, each of the front end computers 18a–18b must also be able to send messages to the one or both of the process control computers 12a–12b during time periods outside of the SDSS and DSS data acquisition windows.

In order to further faciliate the ability of the front end communication system to acquire the SDSS and DSS data sets without any data transfer blocknecks, and also provide the ability to group and time align the data sets being received, each of the front end computers 18a–18b includes a set of at least three reflective buffers for each of the process control computers 12a–12b. Each of these logically distinct reflective buffers or shadow memories may reside in the same physical memory chip or chip set in the front end computer 18. As shown in FIG. 1, the set of reflective buffers contained in the front end computer 18a is generally comprised of a ZERO buffer "ZL" 46a for the Left process control computer 12a, a ZERO buffer "ZR" 48a for the Right process control computer 12b, a ONE buffer "OL" for the Left process control computer, a ONE buffer "OR" for the Right process control computer, a TWO buffer "TL" for the Left process control computer, and a TWO buffer "TR"

for the Right process control computer. Additionally, it should be understood that a corresponding set of reflective buffers are contained in the front end computer 18b, such as the ZERO buffer "ZL" 46b for the Left process control computer 12a and the ZERO buffer "ZR" 48b for the Right process control computer 12b.

The IFQ circuit 30 writes to these left and right buffers in a "round robin" fashion using DMA data transfers. In other words, the IFQ circuit 30 will fill the ZERO buffer 46a with pre-link and post-arbitrated data of a particular process control cycle from the Left process control computer 12a. Then, when pre-link and post-arbitrated data for the next process control cycle is received from the Left process control computer 12a, the IFQ circuit will increment to the ONE buffer 50a in order to store this data. Similarly, the IFQ circuit 30 will turn to the TWO buffer 54a when pre-link and post-arbitrated data for the third process control cycle is received from the Left process control computer 12a in order to store this data. Then, when pre-link and post-arbitrated data for the forth in time process control cycle from the Left process control computer 12a is to be stored, the IFQ circuit 30 will return to address the ZERO buffer 46a for data storage. Of course, it should be appreciated that the IFQ circuit 30 will employ the same round robin sequence for individually transfering pre-link and post-arbitrated data to the three reflective buffers 48a, 52a and 56a that are used for the Right process control computer 12b.

For purposes of illustration, FIG. 1 shows three reflective memory buffers (46a, 50a and 54a) for the Left process control computer 12a, and three reflective memory buffers (48a, 52a and 56a) for the Right process control computer 12b. However, as the SDSS and DSS data transfers are treated as independent DMA events, the reflective memory buffers preferably include distinct reflective memory buffers for each of these events. Accordingly, a total of twelve reflective memory buffers are preferably provided in the front end computer 18. Additionally, each of these reflective memory buffers are individually tracked, so that the ordering of these buffers do not necessarily have to follow the regimen shown below:

Second N: (ZERO-SDSS-L ZERO-DSS-L ZERO-SDDS-R ZERO-DSS-R)
Second N+1: (ONE-SDSS-L ONE-DSS-L ONE-SDDS-R ONE-DSS-R)
Second N+2 (TWO-SDSS-L TWO-DSS-L TWO-SDDS-R TWO-DSS-R)

Rather, the ordering of these buffers could also proceed under other regimens, such as shown below:

Second N: (ONE-SDSS-L TWO-DSS-L ZERO-SDDS-R ONE-DSS-R)
Second N+1: (TWO-SDSS-L ZERO-DSS-L ONE-SDDS-R TWO-DSS-R)
Second N+2 (ZERO-SDSS-L ONE-DSS-L TWO-SDDS-R ZERO-DSS-R)

It is important to understand that the corresponding left and right reflective buffers (e.g., buffers 46a and 48a) will generally not become filled at the same time, as the program time line of the process control computer in the dog mode should follow the program time line of the process control computer in the fox mode by a predeterminable period of time (e.g., 20-microseconds to 20-milliseconds). However, these time lines may become considerably separated in the event that communications across the major link 14 are not possible, as mentioned above. Even when the left and right SDSS or DSS signals are asserted at near the same time, the delays required to transfer this information to the IFQ circuit 30 and then transfer this information into the appropriate reflective memories may result in a wider time skew between these events as seen by the application software of the front end computer 18 than as seen by the process control computer and IFS circuit hardware. Nevertheless, it is the responsibility of the front end computer 18 to ensure that the data sets ultimately made available to the computer network 20 represent data from the process control computers 12a–12b in the same program cycle (e.g., a one second period). In this regard, the application software of the front end computer 18 includes a procedure, referred to as "MI Sync", which groups individual data transfer events into a cohesive set of buffers that represent a "snapshot" of the pre-link and post-arbitrated data for a particular process control cycle.

The MI Sync procedure uses a set of reflective memory buffer management structures (MI_RMBMS) to track the status of incoming data transfers. When the IFQ circuit driver software signals to the MI Sync procedure that a DMA transfer has completed, MI Sync records the required information in the appropriate MI_RMBMS data structure. When MI Sync determines that a complete set of buffers has been received and stored (i.e., left SDSS, right SDSS, left DSS and right DSS), it updates a global data structure (MI_RM_DATA) with the pointers to the newly received data. These pointers are copied from the MI_RMBMS data structure. Accordingly, MI_RM_DATA includes the pointers to the currently available "complete" or time aligned set of reflective memory buffers. Depending upon where the front end computer 12 is in the round robin procedure, the most current time aligned set of reflective memory buffers may be TWO buffers 54a and 56a at one time interval, the ONE buffers 50a and 52a at the next time interval, and the ZERO buffers 46a and 48a at the following time interval. In the event that the SDSS or DSS data from one of the process control computers 12a–12b is not received by the IFQ circuit 30, MI Sync will still maintain time alignment by using an appropriate timeout (e.g., 700 milliseconds) for updating the MI_RM_DATA pointers. An indication will also be provided as to which buffer or buffers are unavailable.

The buffer pointers within MI_RM_DATA are protected by a mutual exclusion semaphore or "mutex". MI SYNC requests this mutex before copying the new pointers to MI_RM_DATA and releases it immediately after the copy is complete. When a network entity needs to access reflective memory data, a copy of the M_RM_DATA pointers is made by requesting the mutex, copying these buffer pointers to a local data structure, and then releasing the mutex. Since the application for querying or reading the data uses a copy of the pointer, contention for the mutex is minimized, and MI Sync will be able to update MI_RM_DATA with new pointers as soon as the next complete set of data has been stored. In this regard, it is important to note that this method will enable the reading application to still access the same set of reflective memory buffers while MI Sync updates MI_RM_DATA with new pointers. Since reading applications will access the most current time aligned set of reflective memory buffers, it should be understood that a reading application could be accessing one set of reflective memory buffers (e.g., the TWO buffers 54a and 56a), while a subsequent reading application could be given access to another set of reflective memory buffers (e.g., the ONE buffers 50a and 52a) once MI Sync updates MI_RM_DATA with new pointers.

It should also be understood that applications which access the reflective memories will be able to run to completion before the referenced buffers are overwritten with new incoming data. In one embodiment of the front end communication system 10, applications requiring reflective memory data are assigned execution priorities high enough to allow them to run to completion in less than one second. However, it should be appreciated that the front end computer 18 could be configured with additional sets of buffers to allow the development of an application that may take longer to run to completion.

It should also be appreciated from the above that the use of the front end computers 18a–18b also enables the communication system 10 to have the necessary intelligence to answer specific data requests. The use of the front end computers 18a–18b also permit a rapid check to be made that the process control computers 12a–12b are in fact continuing to send real-time data. Additionally, the front end computers 18a–18b are also preferably programmed to make determinations as to whether read or write requests from the process control computers 12a–12b should be granted with respect to the entity on the computer network 20 which has forwarded the request. As will be discussed more fully below the front end computers 18a–18b contain both a security table and two permissive tables in their memories for facilitating these determinations. The security table is used determine whether communications will be permitted at all with various entities on the computer network 20, while the permissive tables are used to evaluate write command messages from an entity on the computer network which could affect specific locations in the dual-ported data memories 22a–22b.

Figure 2A:
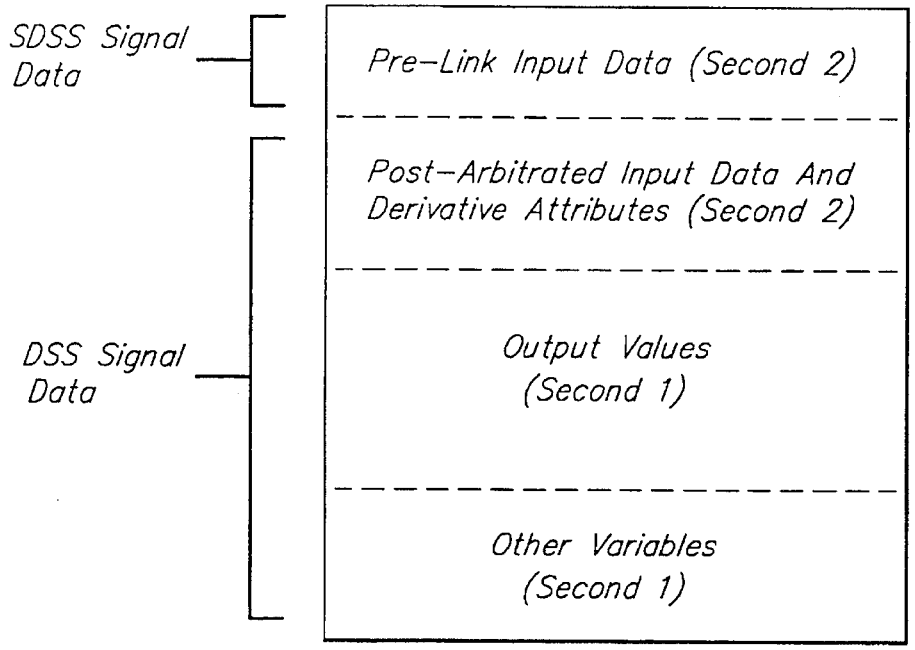
FIGS. 2A and 2B provide a diagrammatic representation of the data tables stored in a time aligned reflective memory buffer and the Correlate buffer shown in FIG. 1.
Figure 2B:
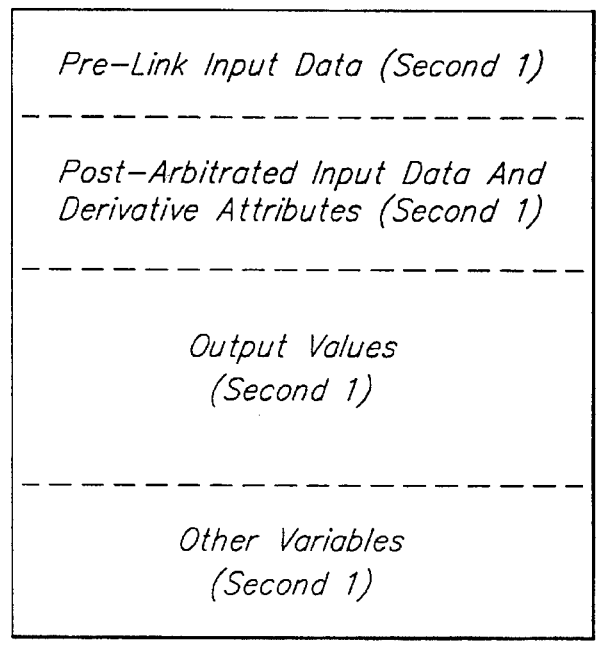

The front end computers 18a–18b may also utilize at least one set of additional reflective buffers, such as Correlate buffers 58a and 60a. In light of the fact that the DSS data set will contain the post-arbitrated input value data from the current program cycle and the output value data that was based upon the post-arbitrated input values of the immediately preceding program cycle, it may be desirable to correlate into one data table the output values for a particular program cycle with the input values used to decide these output values. Accordingly, the front end computer 18a may employ the Correlate buffers 58a and 60a to store a copy of the post-arbitrated input values from the current DSS data set, and then wait for the alignment of the next DSS data set in order to store a copy of the output values from this subsequent data set in the same Correlate buffers. In this regard, it should be appreciated that this copying procedure will be made from the most current time aligned set of reflective memory buffers. Thus, for example, FIG. 2A shows a diagrammatic example of a data table in a time aligned buffer, while FIG. 2B shows a similar example of a data table in the Correlate buffer "CL". In any event, it should be understood that the time alignment capabilities of the front end computers 18a–18b provide a powerful diagnostic tool for analyzing both the operation of the process control computers 12a–12b and the physical process being controlled. For example, the arbitration performed with respect to the input data values may be analyzed for both of the process control computers 12a–12b, as pre-link and post-arbitrated input data values are time aligned and made available by the front end computers 18a–18b. A further discussion of these time alignment methods may be found in the Allbery et. al. patent application Ser. No. 08/273,773, now U.S. Pat. No. 5,519,603, filed on even date herewith, entitled "Intelligent Process Control Communication System and Method". This application is hereby incorporated by reference.

The computer network 20 is shown in FIG. 1 to generally include a direct control segment, a process information segment and a connection to a Wide Area Network "WAN". Each of these network segments preferably employ Ethernet compliant mediums and IEEE 802.3 compatible communication protocols. The direct control segment is comprised of dual Plant Area Networks "PAN-1" and "PAN-2", while the process information segment is comprised of Plant Area Network "PAN-3". At least one bridge 62 is used to interconnect the PAN-1 and PAN-2 segments. Additionally, at least one bridge 64 is used to interconnect the PAN-2 segment with the PAN-3 segment. Another bridge may be used to interconnect the PAN-1 segment with the PAN-3 segment. One or more bridges 66 may also be used to interconnect the PAN-3 segment with the WAN.

It should be noted that the front end computer 18a is coupled to the PAN-1 segment, while front end computer 18b is coupled to the PAN-2 segment. While a single plant area network could be provided, the use of dual plant area networks shown herein have certain communication and redundancy advantages over a single plant area network. In this regard, the bridges will typically filter communications by Ethernet hardware addresses to reduce the amount of traffic on each of the network segments. For example, a communication between the security server 68 and the operator station 70 will not be transmitted across the bridge 62 to the PAN-1 segment. The bridges 62–66 also provide a layer of physical separation between the network segments, so that if a fault occurs on one of the network segments, then the fault will be prevented from adversely affecting the other network segments. Additionally, one or more of the bridges are also used to filter communications on the basis of specific data communication protocol identifications to enhance the overall security of the network 20. For example, the bridge 64 may be used to prevent the transmission of messages employing the Ethernet compliant protocol used by the security server 68 from one of the PAN-2 and PAN-3 segments to the other. Similarly, the bridge 64 may be used to prevent the transmission of messages employing the Ethernet compliant protocol used to write information into the mailbox section 26 of the dual-ported data memory.

The computer network 20 also includes a plurality of operator workstations, such as operator workstations 70 and 72. As shown in FIG. 1, these operator workstations may be located on different network segments, and the number of operator workstations will be dependent upon the particular process control application. One or more of these operator workstations may be used to view or analyze data received from the front end computers 18a–18b. Additionally, these operator workstations may be used by an authorized control room operator to transmit the appropriate instructions to the front end computers 18a–18b which will cause a command message to be conveyed to the process control computers 12a–12b.

The network 20 further includes a process information computer 74 which may perform a variety of functions. For example, the process information computer may be used to store a history of process data received from the front end computers 12a–12b. Additionally, the process information computer 74 may be used to store the compilers needed to change the computer programs residing in the front end computers 18a–18b, as well as the programs residing in the process control computers 12a–12b. The process information computer 74 may also include loading assistant software for transfering operating program revisions to the process control computers 12a–12b. The network also includes a control room data manager computer 76, which may be used to perform various file serving and tracking functions among the computers connected to the network.

An expert download assistant 78 is also provided to facilitate program revisions in the front end computers 18a–18b. In contrast, the loading assistant software in the process information computer 74 may be used to cause a new computer program to be downloaded to one of the process control computers 12a–12b through at least one of the front end computers 18a–18b and the mailbox section 26 of the dual-ported data memory 22. While the download assistent 78 may be resident in its own network computer, the download assistent could also reside in a suitable network computer, such as the process information system computer 74.

The loading assistant may also be used to cause the process control computer with the revised program to start operating in a mode which will enable real-time testing of the revised program. In this mode of operation, the process control computer will recieve input data and make output decisions, but these output decisions will not be transmitted to the field instrumentation devices. This will permit the plant engineer to evaluate the revisions, and even make further revisions if necessary before instructing the process control computer to assume an active mode of operation, such as the fox or dog modes.

Whenever it is decided that the manner in which the process control computers 12a–12b perform their particular manufacturing control operations should be changed through a program revision, the revised program for the process control computers 12a–12b must be compiled from the the source programming language to an executable file or set of dynamically linked files. In the preferred embodiment, a unique identifier is embedded into the executable code during the compile procedure. This identifier represents (or is otherwise associated with) the version of the revised software for the process control computers 12a–12b. The program version identifier is used to ensure proper alignment between the version of the program being executed by the process control computers 12a–12b and the files/tables in the front end computers 18a–18b used to evaluate write command messages to these process control computers.

As mentioned above, each of the front end computers 18a–18b include two permissive tables, such as the "PL" permissive table 80a for the Left process control computer 12a, and the "PR" permissive table 82a for the Right process control computer 12b. These permissive tables are used by the front end computers 18a–18b to determine whether any entity on the computer network 20 should be permitted to change the contents of specific locations in the dual-ported data memories 22a–22b. However, it should be appreciated that the data structure of the permissive table could be constructed to protect the contents of any memory location or area in the process control computers 12a–12b which could altered from a write command message.

When a message is received by a front end computer 18 from an entity on the network which uses the write command protocol, such as a write command message from one of the operator workstations 70–72, a "data_write_check" sub-routine will be called by the central process unit of front end computer. The data_write_check routine will perform a comparison between the variable elements identified in the write command message and the variable elements in the permissive table for which changes should be authorized or denied. For example, if the front end computer 18a receives a write command message which seeks to increase/decrease an analog gain "AG" factor used by the program being executed by the Left process control computer 12a, the front end computer 18a will look up the element word for this particular AG factor in permissive table 80a and determine if a bit has been set to deny the authorization needed to change this factor. If authorization is denied, then the front end computer 18a will not transmit the write command message to the process control computer 12a. Instead, the front end computer 18a will preferably send a reply message to the host entity on the computer network 20 that originally sent the write command message, to inform the host entity that a write error has occured.

From the above, it should be appreciated that the PL and PR permissive tables stored in the front end computers 18a–18b need to be closely coordinated with the version of the program being executed by each of the process control computers 12a–12b. In order to ensure that each of these permissive tables are sufficiently matched with the programs being executed by their respective process control computers 12a–12b, the program version identifier discussed above is also embedded into these permissive tables when they are compiled. This program version identifier may then be sent to the process control computer 12 along with a verified write command message, so that the process control computer 12 will be able to confirm that the commanded variable change is appropriate to its program version.

To enhance the security of this verification process, the program version identifier from the permissive table is preferably altered by a suitable encryption algorithm before it is transmitted with the write command message to the mailbox section 26 of the stealth interface circuit 16 for the intended process control computer 12. The process control computer 12 receiving the write command message will then decode this version identifier, and compare it with the program version identifier embedded in its program to determine if their is a match. If the program version identifiers match, then the process control computer 12 will perform the commanded variable change. Otherwise, the process control computer 12 will respond by discarding the write command message and transmitting an appropriate error message to the front end computer 18.

The PL and PR permissive tables are also preferably provided with a data structure which permits write command authorization determinations to be made for specific host entities on the computer network 20. In other words, the permissive table 80a may permit particular variable changes to be made from operator workstation 70 that are not allowed to be made from operator workstation 72. Thus, the permissive tables may have several station specific table sections, as well as a default table section. Nevertheless, the ability may also be provided to bypass a check of the appropriate permissive table, through the use of a suitable password at a host entity on the computer network 20. However, in this event, a log should be created and stored in the front end computer 18 which will identify this transaction and the identity of the host entity (e.g., a CPU identifier).

It should be noted that the use of separate permissive tables for the process control computers 12a–12b has the advantage of enabling a program downloading operation to be performed on one of the process control computers while the other process control computer continues to actively control a manufacturing process. Indeed, even after a revised program has been successfully transferred to the process control computer 12a (and the corresponding permissive table 80a loaded in front end computer 18a), the use of separate permissive tables will enable the front end computer 18a to evaluate a write command message intended for the process control computers 12a which is distinct from a write command message intended for the process control computer 12b. While it may not be advisable in some circumstances to run the process control computers 12a–12b with different program versions in an active control mode, a passive operating mode may be used for the process control computer with the revised program while the other process control computer is in an active control mode. In such an event, the plant engineer may use the download assistant 78 during final program testing to issue write command messages for the passive process control computer, while another plant engineer issues write command messages to the active process control computer through the same front end computer 18.

The security server 68 is used to inform each of the computers residing on the network 20 who they may communicate with on the network. In this regard, the security server stores a specific security table for each of the valid entities on the network. Each of these security tables will identify which of the network computer entities a particular network computer may conduct bi-directional communications. For example, in the case of the front end computers 18a–18b, one of the first functions on start up will be to obtain their respective security tables from the security server 68. Accordingly, the security server 68 is shown in FIG. 1 to store a security table "S1" for the front end computer 18a, and a security table "S2" for the front end computer 18b. While the security server could also be used to send the PL and PR permissive tables discussed above to the front end computers 18, it is preferred that newly compiled permissive tables be received from the download assistant 78. In this regard, it should be noted that the download assistant is also preferably used to send the transfer map 37 intended for the IFS circuit 28 to the front end computer 18 along with the appropriate permissive table.

In order to assure the integrity of security table transfers from the security server 68 to the front end computers 18a–18b, a method of validating these transfers is utilized in the present embodiment. In accordance with this method, the front end computer 18 will embed a random or pseudo-random number in a broadcast network message to request that the security server 68 identify itself as a prelude to sending the appropriate security table. The security server will respond to this request with an acknowledgement message that utilizes a security protocol identifier which is different than that used with other types of network messages. Importantly, this acknowledgement message will include the random number from the front end computer 18 in a transformed state. In this regard, a suitable encryption algorithm may be used to alter the random number, and the random number should have a bit length which will make it difficult for any unauthorized entity to decode (e.g., 32 bits). Upon receipt of the acknowledgement message, the front end computer 18 will then either reverse the encryption process to obtain the random number or encrypt its original random number to make a comparison between the transmitted and received random numbers. Assuming that these random numbers match, then the front end computer 18 will determine that the acknowledgement message has been received from a valid security server, and the transfer process will proceed.

In order to further enhance the security of communications between the front end computers 18a–18b and other entities on the computer network 20, an additional validation procedure is preferably implemented. More specifically, this additional validation procedure is utilized to permit communication between the front end computers 18a–18b and any network entity for which a write command message may be recognized. In accordance with this validation method, the front end computer 18 will send a contract offer message on a periodic basis to the Ethernet address of each host entities on the network 20 which it recognizes as having a write message capability. Each of these contract offer messages will include a random or pseudo-random number or other suitably unpredicable message component. In order for a host entity to able to have its write command messages recognized, it must respond to its contract offer message within a predetermined period of time (e.g., 10 seconds) with a contract acceptance message that includes a transformed version of this unpredictable message component. While any appropriate encryption algorithm be used for this purpose, it is preferred that this encyrption algorithm be different than the encryption algorithm used to validate the transfer of a security table from the security server 68. Additionally, it should be noted that the security message protocol may be used for these contract offer and acceptable messages.

The front end computer 18 will then decrypt the random number embedded in the contract acceptance message to determine if a time limited communication contract will be established between the front end computer and this host entity at the specific Ethernet address for the host entity that was contained in the security table. This time limited communication contract will ensure that a write command message link between a front end computer 18 and a particular host entity will be reliable and specific. Thus, for example, the front end computer 18a will send a contract offer message to the Ethernet address of the operator workstation 72 which will contain a new random number (e.g., 32 bits in length). The operator workstation 72 will respond with a contract acceptance message that includes an encrypted version of this particular random number. Then, the front end computer 18a will either decrypt this number with the contract algorithm key stored in its memory for this purpose or use the same encryption algorithm to compare the offer and acceptance numbers. If these numbers match, then the front end computer 18a will be process write command messages from the operator workstation 72 for a predetermined period of time. Otherwise, if the numbers do not match, then the front end computer 18a will disable a write command authorization bit for the Ethernet address of the operator workstation 72 from its security table S1 to indicate that write commmand messages from this operator workstation should be ignored.

The communication contract established for write command messages is time limited to enhance the transmission security of these particular messages. In the preferred embodiment, the communication contract will automatically expire within twenty seconds after being initiated. Nevertheless, in order to ensure that the ability to send write command messages is not interrupted, the contract offer messages should be sent from the front end computer 18 to each of the appropriate host entities on the network 20 on a periodic basis which will provide this continuity. For example, with a communication contract of twenty seconds, it is preferred that the contract offers be transmitted at a rate of approximately every ten seconds. In other words, every ten seconds, each of the host entities that are cabable of transmitting recognizable write command messages will receive a new random number from each of the front end computers 18.

In the event that a host entity fails to respond to a contract offer message from a front end computer 18, the front end computer will preferably make three tries to establish or maintain a time limited communication contract. If no response is received from these three tries, then the the front end computer 18 will disable the write command authorization bit for the Ethernet address of this host entity from its security table. In such an event, the affected host entity will not be able to have its write command messages processed by the front end computer 18 until the security server 68 transmits a new security table to the front end computer 18.

It should be appreciated from the above that only the random numbers need to be encrypted to facilitate a transfer of the security table or to establish the time limited communication contract for write command messages. However, it should be understood that the security table itself or the write command messages could be encrypted as well in the appropriate application. Nevertheless, the use of different Ethernet protocols for security messages and write command messages, the use of different encryption algorithms for security table transfers and write command communication contracts, the limitation of the time of the write command communication contracts to short durations, and the use of specific permissive tables for each of the front end computers 18, all combine to provide a very high degree of communication and write command security for the process control computers 12a–12b. Additional protection is also substantially provided by the guardian circuit in the stealth interface circuit 16, the embedding of a program version identifier in the PL and PR permissive tables, and the encryption of the these program version identifiers by the front end computers 18a–18b when a verified write command message is transmitted to the process control computer 12a–12b. In this regard, it should be noted that the encryption algorithm used by the front end computers 18a–18b for the program version identifiers is preferably different than the encryption algorithm used for security table transfers or the encryption algorithm used to establish the time limited communication contracts for write command messages. A further discussion of these security and verification features may be found in the de Bruijn et. al. U.S. Pat. No. 5,428,745, filed on even date herewith, and entitled "Secure Front End Communication System and Method". This patent is hereby incorporated by reference.

Figure 4A:
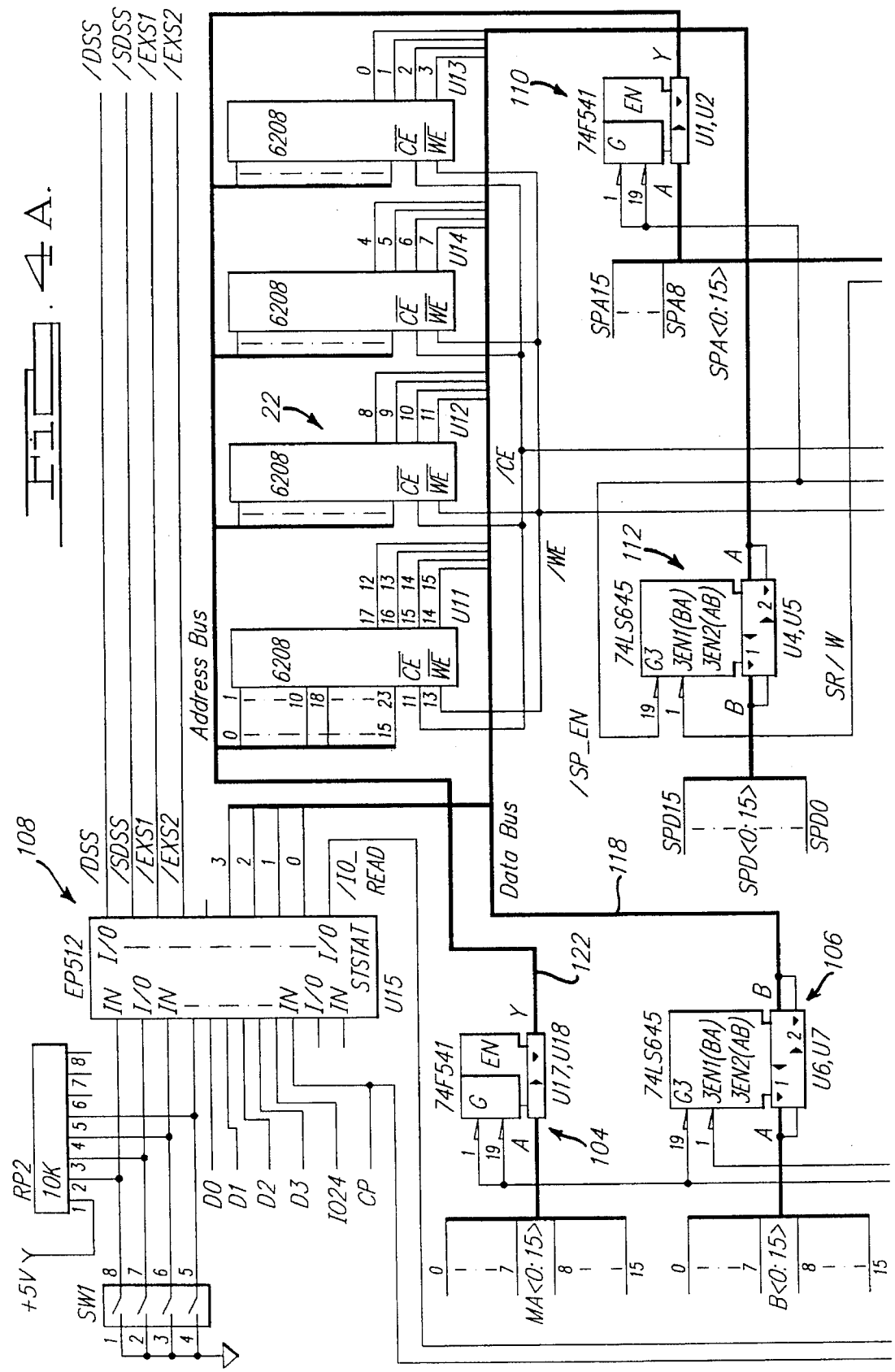
FIGS. 4A and 4B comprise a schematic diagram of the stealth interface of FIGS. 1 and 3.
Figure 4B:
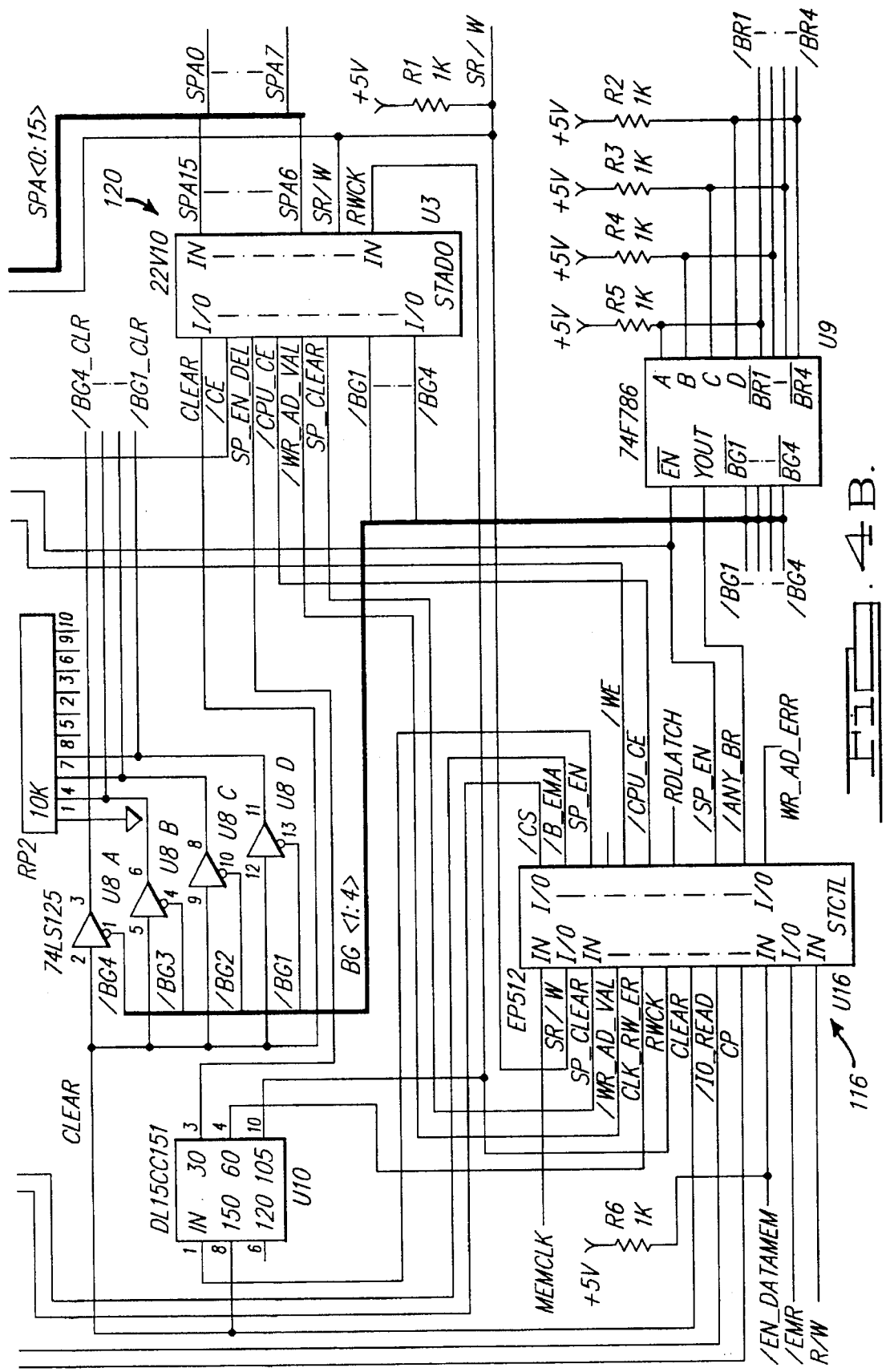

Turning to FIG. 3, a block diagram of the stealth interface circuit 16 is shown. Reference will also be made to the schematic diagram of the stealth interface circuit 16, which is shown in FIGS. 4A–4B. The stealth interface circuit 16 is interposed between the internal bus structure 100 of the process control computer 12 and the externally directed stealth port 102. The stealth interface circuit 16 is connected to bus structure 100 via a set of suitable buffers. In this regard, buffer block 104 includes two 8-bit buffer circuits U17–U18, which receive address information from the address bus on the process control computer 12. Similarly, buffer block 106 includes two 8-bit buffer circuits U6–U7, which receive data information from the data bus of the process control computer 12.

The stealth interface circuit 16 also includes a data control block 108, which is also connected to the bus structure 100 of the process control computer 12. As indicated in FIG. 4A, the data control block 108 is preferably comprised of a Programmable Array Logic "PAL" circuit U15 (e.g., EP512), which is used to detect the SDSS and DSS signals from the process control computer 12. As well known in the art, a PAL circuit has fusable links which may be programmed so that a plurality of internal AND gates and OR gates will be configured to performed a desired logic function. While a PAL circuit provides a relatively low cost way of implimenting logic functions, it should be understood that other suitable circuit devices may be used for this application. It should also be noted that the PAL circuit is programmed to detect two extra strobe signals that may be generated by the process control computer 12, namely the "EXS1" and "EXS2" signals. One or both of these extra strobe signals may be used by the process control computer 12 to indicate that certain data stored in the dual-ported data memory 22 is stable, such as data used to display graphical information.

Figure 5A:
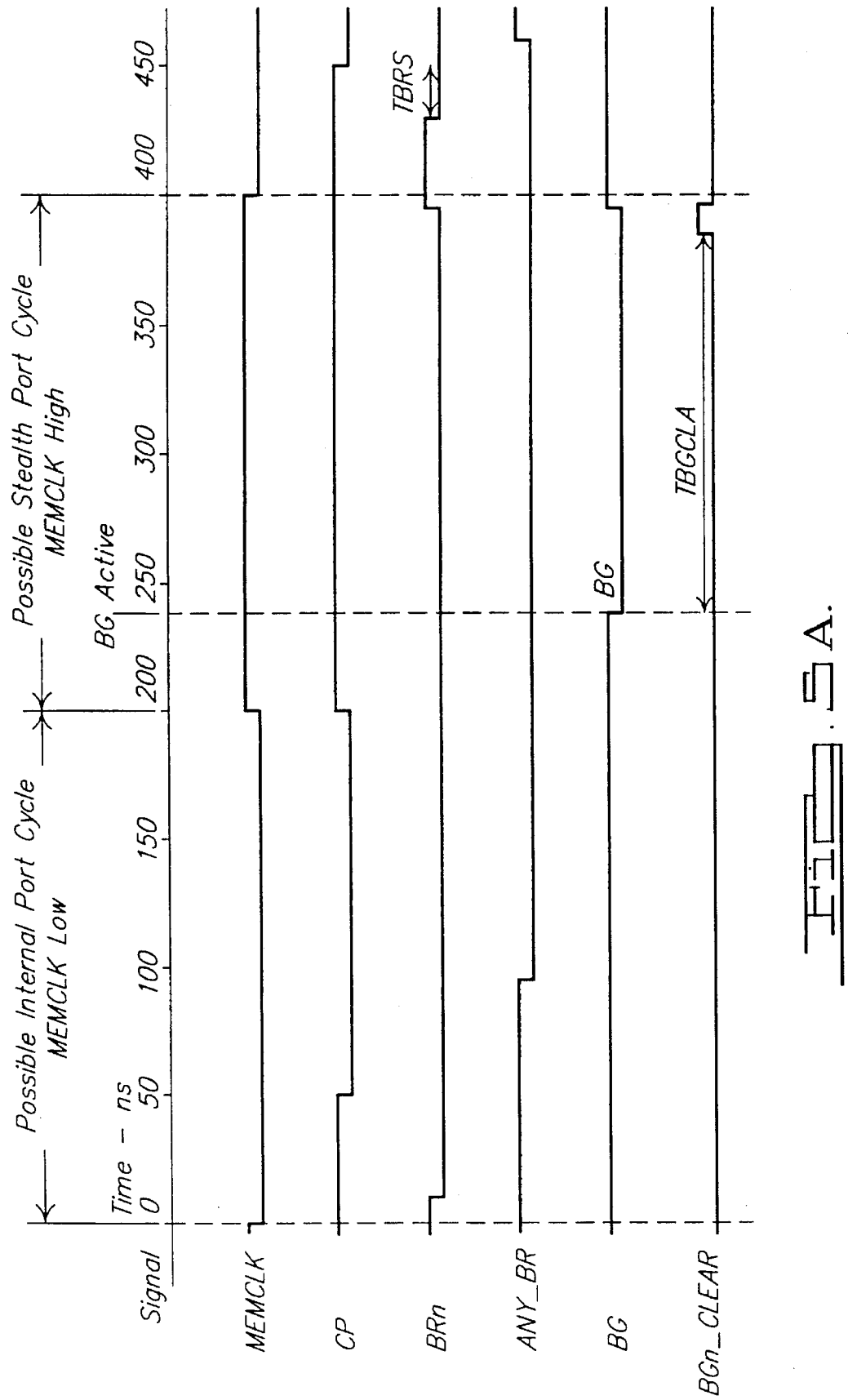
FIGS. 5A and 5B illustrate two timing diagrams for the stealth interface.

The stealth interface circuit 16 also receives four control signals from the process control computer 12 which are used to access the dual-ported data memory 22. These signals are "/EN_DATAMEM", "/EMR", "R/W" and "MEMCLK. The first three of these signals relate to whether the process control computer 12 seeks to read or write to the dual-ported data memory 22. However, MEMCLK is the memory clock signal referred to above which effectively divides the time in the machine cycle of the process control 12 available for accessing the dual-ported data memory 22. The MEMCLK signal is a fifty percent duty clock signal, as shown in the timing diagram of FIG. 5A. In accordance with the method illustrated in this timing diagram, the dual-ported data memory 22 may be accessed from the internal process control computer port 100 when MEMCLK is Low. Then, when MEMCLK undergoes a transition to a High state, the dual-ported data memory 22 may be accessed from the external stealth port 102. While the MEMCLK signal is shown to have a period of 400 nano-seconds (i.e., a frequency 2.5 MHz), it should be understood that other suitable periods and duty cycles may be provided in the appropriate application.

On the stealth port side of the stealth interface circuit 16, a set of suitable buffers are also provided to handle the transfer of address and data information. In this regard, buffer block 110 includes two 8-bit buffer circuits U1–U2, which receive address information from the external stealth port 102. Similarly, buffer block 112 includes two 8-bit buffer circuits U4–U5, which are capable of transmitting and receiving data information between the dual-ported data memory 22 and the stealth port 102.

Additionally, the stealth interface circuit 16 includes a arbitration circuit 114 which receives bus request signals from external entities on the stealth port 102. As shown in FIG. 4B, the present embodiment provides four individual channel lines for the incoming bus request signals "/BR1 . . . /BR4". Thus, the stealth interface circuit 16 enables up to four different external entities to be connected to the stealth port 102. The arbitration circuit 114 is shown in FIG. 4B to comprise a four input asynchronous bus arbiter circuit U9 which will grant bus access to the first bus request signal received. In this regard, a specific bus grant signal "/BG1 . . . /BG4" will ultimately be generated to inform the particular external entity who won the bus that the channel is clear for its use. The arbitration circuit 114 also has an internal AND gate which will produce the any-bus-request signal "/ANY_BR" shown in the timing diagram of FIG. 5A.

The stealth interface circuit 16 further includes a stealth port control circuit 116, which is used to control access to the dual-ported data memory 22. The control circuit 116 is shown in FIGS. 4A–4B to comprise a PAL circuit U16, a timer circuit U10 and a set of tri-state buffers which are contained in chip U8. In the case of memory access for the internal process control computer bus 100, the PAL circuit U16 will transmit the chip select signal "/CS" to the buffers 104 and 106 to latch or capture address and data information from the internal bus. The PAL circuit U16 will also send the enable memory read signal "/B_EMR" to the buffer 106 when the process control computer 12 needs to latch or capture data from the data bus 118 of the stealth interface circuit 16. In this regard, the PAL circuit U16 is responsive to both the MEMCLK signal and the central process unit clock signal "CP" of the process control computer 12.

In the case of memory access from the external stealth port 102, the PAL circuit U16 will transmit the enable signal "/SP_EN" to the buffers 110 and 112 to latch or capture address and data information from the external bus. The PAL circuit U16 will also send the enable memory read signal "SW/R" to the buffer 112 when an external entity is permitted to latch or capture data from the data bus 118 of the stealth interface circuit 16. The SW/R signal is received at the stealth port bus 102, and it provides an indication from the external entity the direction of data flow desired. In this particular embodiment, the SR/W signal is active High for a read cycle and active Low for a write cycle. The SR/W signal is common to all four potential external users, and it should be held in a tri-state until the external user winning the bus receives its active Low /BR signal.

The PAL U16 also transmits the SW/R signal to the check point guardian circuit 120 (PAL circuit U13) to initiate an evaluation to be made on the address of the dual-ported data memory 22 selected by the external entity for a write operation. In this regard, the guardian circuit 120 is programmed to inhibit the transition needed in the chip enable signal "/CE" for accessing the dual-ported data memory chips U11–U14, whenever the address is outside of the mailbox section 26.

With respect to the sequence of operation for the stealth interface circuit 16, it should be appreciated that a memory read/write cycle from the stealth port 102 must be initiated by the external entity seeking to access the dual-ported data memory 22. This cycle is begun with the transmission of a bus request signal /BR from the external entity, such as front end computer 18a. Upon the receipt of any bus request signals, the arbitrator circuit 114 will transmit an active Low any-bus-request signal /ANY_BR to the PAL circuit U16. The any-bus-request signal is directed to an internal flip-flop of the PAL circuit U16, which operates under the clock signal CP. Accordingly, the any-bus-request signal needs to be present before the falling edge of the clock signal CP in order for stealth port access to occur when MEMCLK goes high, as shown in the timing diagram of FIG. 5A. If the latched any-bus-request signal is active, the stealth interface circuit 16 will begin a stealth port memory cycle. Otherwise, the stealth interface circuit 16 will not initiate a stealth port memory cycle until the next MEMCLK signal period.

When a stealth port memory cycle occurs, the /SP_EN signal is generated from the PAL circuit U16. As indicated above, this signal will enable the address and data buffers on the stealth port. The /SP_EN signal will also enable the arbitration circuit 114, which issues a specific bus grant signal /BG for the external user which wins the bus. Once the external entity detects its bus grant signal, then it may transmit either the memory address it seeks to read or the address and data necessary for a write operation. The chip enable signal /CE is delayed by the PAL circuit U13 to allow for the delay introduced from the address buffer 110, as the address needs to be stable before the RAM chips U11–U14 are actually accessed.

Figure 5B:
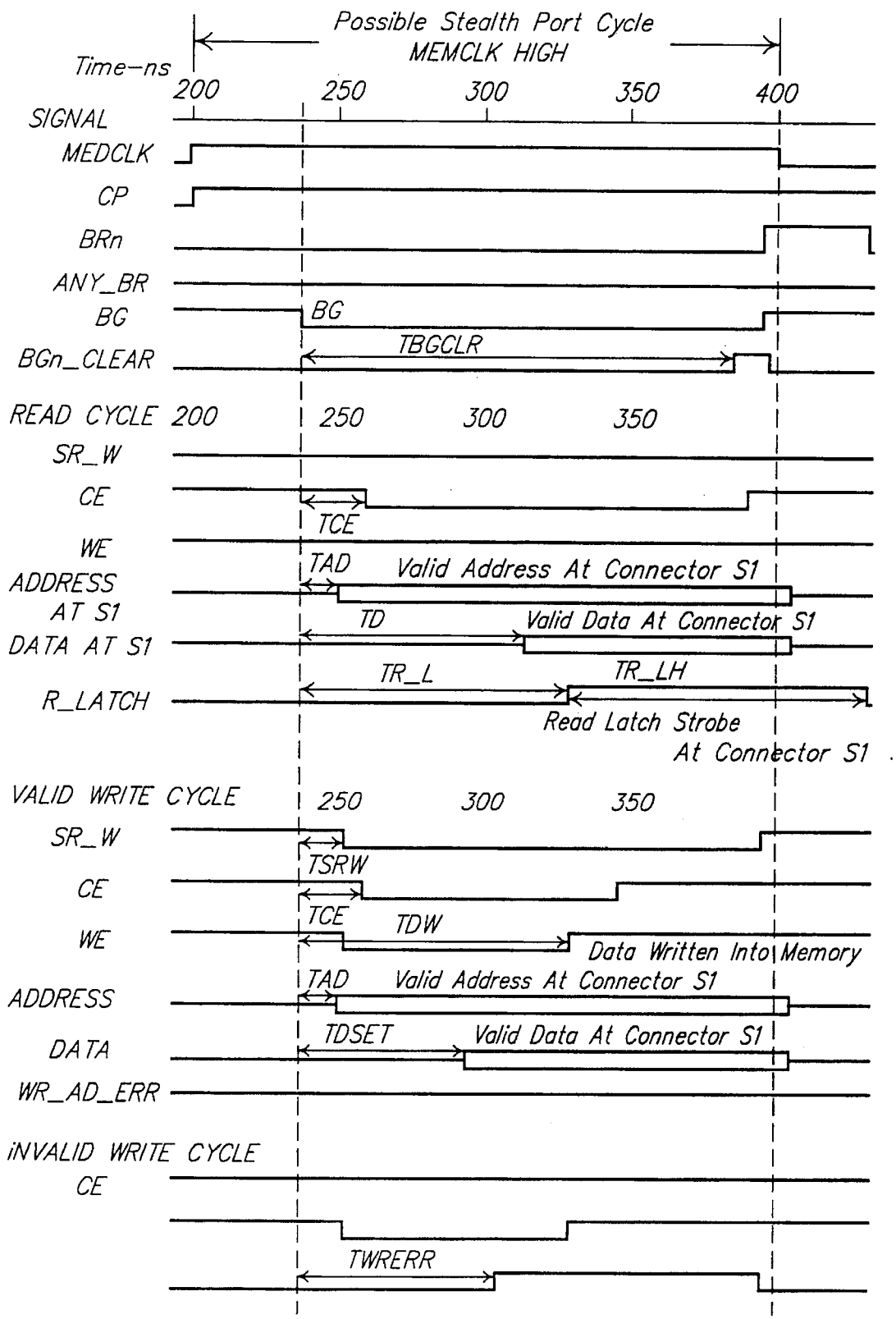

For a stealth port read cycle, the data placed on the data bus 118 will become stable approximately 45 ns after /CE becomes active. In this regard, it should be noted that symbols such as "TCE" in the timing diagram of FIG. 5B, indicate the appropriate delay time duration. A read latch signal RDLATCH directed to the PAL circuit U16 may then be used by the external entity to either latch the data into the buffer 112 or indicate that data is available. For a stealth port write cycle, the address lines on the address bus 122 will be monitored by the guardian circuit 120 to ultimately permit or deny write access to the stealth port 102. When write access is denied, the guardian circuit will not generate the active Low chip enable signal /CE, and thereby restrict an external entity on the stealth port 102 from writing to the particular address location in the dual-ported data memory 22 that it has selected. In this event, the guardian circuit 120 will also generate a write address valid signal "WR_AD_VAL", which is transmitted to the PAL circuit U16 of the control circuit 116. The PAL circuit U16 will respond by generating a write address error signal "WR_AD_ERR" for transmission to the external entity. The write address error signal is active High and valid only during the current memory access cycle, and this signal is common to all external entities.

For stealth port accesses to valid write addresses, the guardian circuit 120 will activate the /CE signal. Additionally, the SR/W signal from the external entity should become active when the bus grant signal /BG is Low. The PAL U16 will also cause the write enable signal /WE for the RAM chips U11–U14 of the dual-ported data memory 22 to become active, and the rising edge of the /WE signal is used to write data into these RAM chips.

The control circuit 116 also includes a timer circuit U10, which will generate a CLEAR signal approximately 150 ns after one of the bus grant signals /BG becomes active. The CLEAR signal is used to cause the tri-state buffers in buffer chip U8 to generate individual bus grant clear signals "BG1_CLR . . . BG4_CLR" to each external user. The CLEAR signal is also used to clear the stealth port memory cycle by deactivating the stealth port enable signal /SP_EN.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A method of providing transparent data transfers between an actively redundant process control computer and at least one front end computer which is capable of communicating with a computer network, comprising the steps of:

providing a multi-ported memory having at least one internal port for communicating with said process control computer and at least one external port for communicating with said front end computer;

providing a variable section in said multi-ported memory for periodically storing data collected by said process control computer in said variable section of said multi-ported memory;

providing a mailbox section in said multi-ported memory for storing messages sent from said front end computer to said process control computer; and enabling said multi-ported memory to be addressed from said external port only during a predetermined portion of an operative clock cycle for said process control computer, so that either at least one data word stored in said variable section of said multi-ported memory may be transferred to a memory associated with said front end computer or at least one message word may be transferred from said front end computer to said mailbox section of said multi-ported memory without any interference with the operation of said process control computer.

2. The method according to claim 1, further including the step of preventing at said process control computer the ability to write to predetermined locations in said multi-ported memory from said external port.

3. The method according to claim 2, wherein said preventing step limits the write access capability from said external port to only said mailbox section of said multi-ported memory.

4. The method according to claim 3, wherein the entire contents of said multi-ported memory may be read from said external port.

5. The method according to claim 1, wherein at least one of said messages sent from said front end computer causes a change in a value used by the program of said process control computer.

6. The method according to claim 1, further including the step of selectively enabling additional communication devices to access said multi-ported memory from said external port during said predetermined portion of said operative clock cycle.

7. A stealth interface for providing transparent data transfers between an actively redundant process control computer and at least one front end computer which is capable of communicating with a computer network, said interface comprising:

a multi-ported data memory having an internal port connected to a bus structure of said process control computer and at least one external port for communicating with said front end computer, said multi-ported data memory having a variable section for periodically storing data collected by said process control computer, and a mailbox section for storing messages from said front end computer to said process control computer;

external access control means, coupled to a clock signal associated with operation of said process control computer, for enabling at least one word address in said multi-ported data memory to be accessed from said external port only during a predetermined portion of a cycle for said clock signal; and guardian means connected to said multi-ported data memory for limiting write access permitted from said external port to predetermined address locations in said multi-ported memory.

8. The stealth interface according to claim 7, wherein the predetermined locations are confined to said mailbox section of said multi-ported data memory.

9. The stealth interface according to claim 7, further including timing means for clearing said external port prior to the end of said predetermined portion of the cycle for said clock signal.

10. The stealth interface according to claim 7, wherein said external access control means includes error signaling means for transmitting a write error signal to said external port when said guardian means has denied write access to said front end computer.

11. The stealth interface according to claim 7, wherein said guardian means is comprised of a programmable array logic circuit which is connected to the bus structure of said multi-port data memory.

12. A stealth interface for providing transparent data transfers between an actively redundant process control computer and at least one front end computer which is capable of communicating with a computer network, said interface comprising:

a multi-ported data memory having:
at least one internal port for communicating with said process control computer;
at least one external port for communicating with said front end computer;
a variable section for periodically storing data collected by said process control computer; and
a mailbox section for storing messages from said front end computer to said process control computer; and access control means for enabling said multi-ported memory to be addressed from said external port only during a predetermined portion of an operative clock cycle for said process control computer, so that either at least one data word stored in memory in said variable section of said multi-ported memory may be transferred to a memory associated with said front end computer or at least one message word may be transferred from said front end computer to said mailbox section of said multi-ported memory without any interference with the operation of said process control computer.

* * * * *